United States Patent
Ambale et al.

(10) Patent No.: US 11,372,930 B2
(45) Date of Patent: *Jun. 28, 2022

(54) TEMPLATE-BASED FACETED SEARCH EXPERIENCE

(71) Applicant: ServiceNow, Inc., Santa Clara, CA (US)

(72) Inventors: Padmaprabodh Ambale, Hyderabad Telangana (IN); Sarup Paul, Pleasanton, CA (US); Kushal Kudavale, Hyderabad Telangana (IN); Ryan Currier, Cupertino, CA (US)

(73) Assignee: ServiceNow, Inc., Santa Clara, CA (US)

( * ) Notice: Subject to any disclaimer, the term of this patent is extended or adjusted under 35 U.S.C. 154(b) by 72 days.

This patent is subject to a terminal disclaimer.

(21) Appl. No.: 16/871,679

(22) Filed: May 11, 2020

(65) Prior Publication Data

US 2020/0272665 A1 Aug. 27, 2020

Related U.S. Application Data

(63) Continuation of application No. 15/587,817, filed on May 5, 2017, now Pat. No. 10,650,056.

(51) Int. Cl.
*G06F 16/9038* (2019.01)
*G06F 16/332* (2019.01)

(52) U.S. Cl.
CPC ...... *G06F 16/9038* (2019.01); *G06F 16/3323* (2019.01)

(58) Field of Classification Search
CPC .......... G06F 16/9038; G06F 16/90328; G06F 16/3328
See application file for complete search history.

(56) References Cited

U.S. PATENT DOCUMENTS

| | | | |
|---|---|---|---|
| 6,321,229 B1 | 11/2001 | Goldman |
| 6,609,122 B1 | 8/2003 | Ensor |
| 6,678,887 B1 | 1/2004 | Hallman |
| 6,799,189 B2 | 9/2004 | Huxoll |
| 6,816,898 B1 | 11/2004 | Scarpelli |
| 6,895,586 B1 | 5/2005 | Brasher |
| 7,020,706 B2 | 3/2006 | Cates |
| 7,027,411 B1 | 4/2006 | Pulsipher |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,392,300 B2 | 6/2008 | Anantharangachar |
| 7,610,512 B2 | 10/2009 | Gerber |

(Continued)

*Primary Examiner* — Grace Park
(74) *Attorney, Agent, or Firm* — Fletcher Yoder PC

(57) ABSTRACT

Disclosed herein are enterprise applications and platforms that manage databases containing documents and may employ search systems that allow users to retrieve documents based on queries. The search systems may be configured to retrieve data from several different data sources and may be associated with many of the applications. Furthermore, the search systems may include a faceted interface based on database or document attributes for further search refinement. The faceted interface may be template-based and modular, allowing reconfiguration of the interfaces without substantial rewriting of the application code base.

20 Claims, 8 Drawing Sheets

(56) References Cited

U.S. PATENT DOCUMENTS

| | | |
|---|---|---|
| 7,617,073 B2 | 11/2009 | Trinon |
| 7,685,167 B2 | 3/2010 | Mueller |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,890,802 B2 | 2/2011 | Gerber |
| 7,925,981 B2 | 4/2011 | Pourheidari |
| 7,930,396 B2 | 4/2011 | Trinon |
| 7,933,927 B2 | 4/2011 | Dee |
| 7,945,860 B2 | 5/2011 | Vambenepe |
| 7,966,398 B2 | 6/2011 | Wiles |
| 8,051,164 B2 | 11/2011 | Peuter |
| 8,082,222 B2 | 12/2011 | Rangarajan |
| 8,151,261 B2 | 4/2012 | Sirota |
| 8,224,683 B2 | 7/2012 | Manos |
| 8,266,096 B2 | 9/2012 | Navarrete |
| 8,380,645 B2 | 2/2013 | Kowalski |
| 8,402,127 B2 | 3/2013 | Solin |
| 8,457,928 B2 | 6/2013 | Dang |
| 8,478,569 B2 | 7/2013 | Scarpelli |
| 8,510,349 B1 | 8/2013 | Puttick |
| 8,554,750 B2 | 10/2013 | Rangaranjan |
| 8,612,408 B2 | 12/2013 | Trinon |
| 8,646,093 B2 | 2/2014 | Myers |
| 8,674,992 B2 | 3/2014 | Poston |
| 8,689,241 B2 | 4/2014 | Naik |
| 8,743,121 B2 | 6/2014 | De Peuter |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 8,887,133 B2 | 11/2014 | Behnia |
| 8,983,982 B2 | 3/2015 | Rangarajan |
| 9,015,188 B2 | 4/2015 | Behne |
| 9,037,536 B2 | 5/2015 | Vos |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,239,857 B2 | 1/2016 | Trinon |
| 9,298,816 B2 | 3/2016 | Dimassimo et al. |
| 9,317,327 B2 | 4/2016 | Apte |
| 9,323,801 B2 | 4/2016 | Morozov |
| 9,363,252 B2 | 6/2016 | Mueller |
| 9,412,084 B2 | 9/2016 | Kowalski |
| 9,467,344 B2 | 10/2016 | Gere |
| 9,508,051 B2 | 11/2016 | Falk |
| 9,535,737 B2 | 1/2017 | Joy |
| 9,557,969 B2 | 1/2017 | Sharma |
| 9,613,070 B2 | 4/2017 | Kumar |
| 9,645,833 B2 | 5/2017 | Mueller |
| 9,654,473 B2 | 5/2017 | Miller |
| 9,659,051 B2 | 5/2017 | Hutchins |
| 9,766,935 B2 | 9/2017 | Kelkar |
| 9,792,387 B2 | 10/2017 | George |
| 9,805,322 B2 | 10/2017 | Kelkar |
| 9,852,165 B2 | 12/2017 | Morozov |
| 10,002,203 B2 | 6/2018 | George |
| 10,242,103 B2 * | 3/2019 | Bivens .................. G06F 16/285 |
| 2007/0067275 A1 * | 3/2007 | Shekel ................. G06F 16/9535 |
| 2007/0185836 A1 | 8/2007 | Handy-Bosma et al. |
| 2013/0298050 A1 * | 11/2013 | Emanuel ............... G06F 3/0481 715/764 |
| 2014/0074845 A1 | 3/2014 | Dimassimo et al. |
| 2014/0201647 A1 * | 7/2014 | Scherpa ........... G06F 16/24578 715/747 |
| 2018/0189403 A1 * | 7/2018 | Altaf ................... G06F 16/9535 |

* cited by examiner

FIG. 5

TEMPLATE-BASED FACETED SEARCH EXPERIENCE

CROSS REFERENCE TO RELATED APPLICATIONS

This application is a continuation of U.S. application Ser. No. 15/587,817, filed May 5, 2017, the contents of which is herein expressly incorporated by reference for all purposes.

BACKGROUND

The present disclosure relates in general to systems and methods for digitally searching databases. More specifically, the present disclosure is related to systems and methods that allow modular, template-based configuration of search interfaces for knowledge systems and other document databases.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Certain organizations may employ computer resources hosted in networked environments (e.g., local network servers, remote data centers, cloud-computing environments, etc.) as a repository for organizational knowledge. These repositories may include databases that store documents (e.g., knowledge articles), and that may be used to provide knowledge applications such as technical support pages, knowledge base pages, internet forums, wikis, and other applications that facilitate distribution of knowledge. An example of such applications include peer-to-peer knowledge sharing platforms (e.g., "community pages") that provide forums and other pages for users of software resources to post and interact with content (e.g., forums, questions and answers, blogs, videos, polls, events, etc.) regarding use of software resources in the organization. Knowledge applications, such as peer-to-peer knowledge sharing platforms may be used to provide customer support documents for clients of a corporation and to provide training, internal policy, and procedure documents for members of the corporation or other organization. As a result, the knowledge applications may improve customer satisfaction, decrease support costs, increase productivity, and facilitate quality control procedures in the organization.

These applications and platforms often include use cases for searching the database(s) for specific articles based on user queries. However, different applications may have different user interface specifications related to the context of the application. Moreover, in some situations, the search may be performed over multiple data sources that may be dynamically added or removed. Changes in the search system and in the customer interface that result from these modifications in user interface specifications and data source availability may require costly and lengthy alterations in the code base.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Enterprise applications and platforms that allow exchange of knowledge between users may employ search systems to facilitate information retrieval. The applications, such as forums, blogs, wikis, support pages, etc., may manage the information through storage of documents that may be stored in multiple databases. Embodiments described herein are directed to search systems, which may search for these documents across multiple databases based on a user query, and furthermore may refine the search results using faceted interactions. These facet interactions may provide refinement options to a user based on attributes of the documents stored in the database, and on the architecture of the application and/or platform. Moreover, the facets and their user interfaces may be reconfigured by an administrator without substantial recoding (e.g., no coding, or little coding) of the application and/or platform, by resorting to facet templates.

With the foregoing in mind, in an embodiment a search system is described. The system may include non-transitory memory devices and hardware processors that are configured to perform operations related to the search system, which may include receiving queries, retrieving search results from a database based on the search query, identifying facets from the database based on the search query, and displaying the search results along with the facets. Each facet identified may have multiple facet values associated with an attribute, which may be used to refine the search results. Furthermore, each facet may also be associated with a configurable facet template that is chosen from a set of facet templates. The facet templates of a particular facet may be replaced.

In another embodiment, a system for reconfiguration of facets is described. The system may include a non-transitory memory and hardware processors that are configured to perform operations related to configure the search system, including receiving a facet to be of the search system that a user wishes to configure, receiving at least one attribute that is associated with the facet, and receiving at least one facet template for the facet that is chosen from a set of facet templates.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

The description herein makes reference to the accompanying drawings, wherein like reference numerals refer to like parts throughout the several views.

FIG. 5 is a diagram of a template-based, faceted search user interface (UI) that may be a search system as the one illustrated in FIG. 3, in accordance with an embodiment;

DETAILED DESCRIPTION

Figure 1:
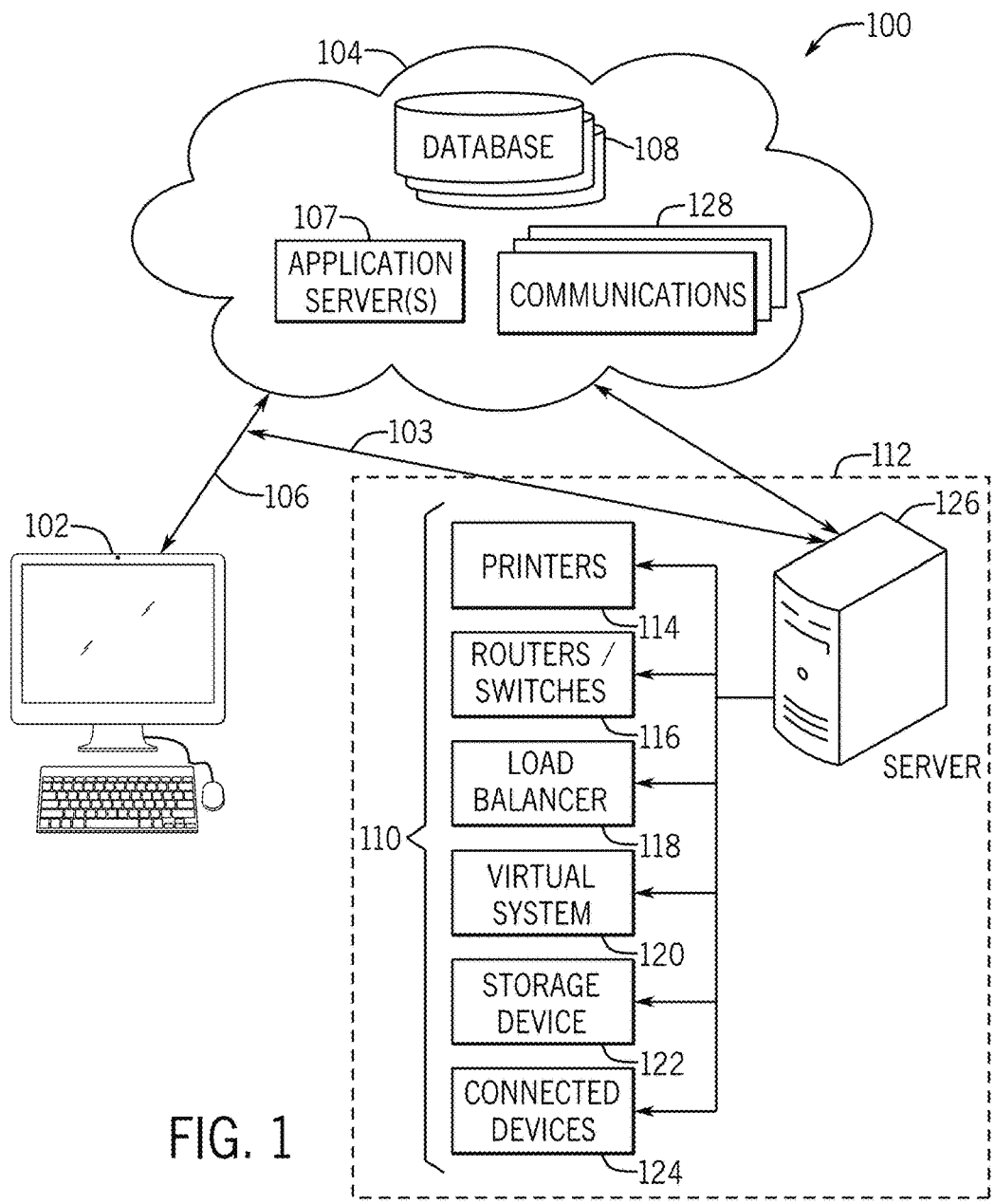
FIG. 1 is a block diagram of a generalized distributed computing system utilizing a platform in the context of a cloud service and may be used to provide knowledge platforms and/or applications, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Many enterprises employ collections of networked computing devices to provide enterprise applications that can improve productivity and/or customer satisfaction. Knowledge applications are applications that may be used to manage, store, index, and distribute documents that may contain information related to products and processes of the enterprise. Knowledge applications may, for example, manage and distribute documents related to product manuals, articles, internal processes, quality control practices, and several other types of information that are part of the enterprise. Examples of knowledge application include customer-facing applications or internal applications, such as knowledge bases, support documentation, forums, wikis, personnel directory, and many other customer-facing applications and/or internal applications.

In some enterprises, many knowledge applications may be integrated around a knowledge platform that integrates the multiple applications and allow for sharing resources. For example, in some organizations, software resources may be associated with a significant time investment for users to learn to operate an application or suite of applications. This results in reduced efficiency for software resource customers as users spend time learning how to use the software instead of performing their usual tasks. Furthermore, providers of software resources may invest significant resources to customer training and customer service to help guide their customers through using the provided software resources. A peer-to-peer knowledge-sharing platform (e.g., "community pages") provides forums and other pages for users of software resources to post and interact with content (e.g., forums, questions and answers, blogs, videos, polls, events, etc.) regarding use of the software resource. Accordingly, users of a software resource may interact with one another via such pages to learn how to best utilize the software resource, thereby reducing redundancies in training, trouble shooting, and customer service. Users of the knowledge-sharing platform may benefit from identifying content through search query based on attributes of the content (e.g., title, author, text, comments, etc.).

In many knowledge applications and platforms, information may be retrieved by employing search systems. Searching provided by the search engines and/or systems may be used to retrieve information quickly, based on a user query. Search systems in knowledge applications may facilitate navigation by allowing direct access to documents for which the user already knows some of the attributes. For example, a user navigating a product manual knowledge application may search directly for the desired document based on the name of the product. In another example, a user navigating a human resources knowledge platform may search directly for content related to the topic across blog posts, wikis, forums, or memorandums managed by different applications. In some situations, the initial user query returns a large number of items as search results. In such situations, a user may want to refine the search results by modifying the query, instead of parsing each item of a potentially long list of items. Search systems may provide user interface (UI) elements (e.g., facets) that allow search refinement in an interactive manner.

The types of UI elements in a search system may depend on the specific knowledge platform/application and on the attributes of its documents. A user querying or refining (e.g., filtering the results) a search in a knowledge application that handles product manuals may, for example, search for a product name, a product family, a manual date. A user querying or refining a search in a support forum may search, for example, for a description of an error, the name of a product, or a rating of provided solutions. A user querying or refining a platform may specify a specific data source (e.g., a database, a table) or a specific application (e.g., a blog, a forum). The different attributes and the different contexts of the knowledge applications and/or platforms may be served by different types of UI elements. Embodiments described herein are related to search engines in which the configuration of the UI elements is facilitated by the use of template-based facets. Using such template-based facets, a search system administrator may seamlessly and dynamically change UI elements of the search system, without substantial rewriting of the code base based on the type of documents and attribute of a facet.

With the preceding in mind and by way of introduction, FIG. 1 is a block diagram of a system 100 that utilizes a distributed computing framework, which may implement one or more of the approaches described herein. As illustrated in FIG. 1, a client 102 communicates with a platform, such as a cloud service 104, over a communication channel 106. The client 102 may include any suitable computing system. For instance, the client 102 may include one or more computing devices, such as a mobile phone, a tablet computer, a laptop computer, a notebook computer, a desktop computer, or any other suitable computing device or combination of computing devices. The client 102 may include client application programs running on the computing devices. The client 102 can be implemented using a single physical unit or a combination of physical units (e.g., distributed computing) running one or more client application programs. Furthermore, in some embodiments, a single physical unit (e.g., server) may run multiple client application programs simultaneously.

The platform 104 may include any suitable number of computing devices (e.g., computers) in one or more locations that are connected together using one or more networks. For instance, the platform 104 may include various computers acting as servers in datacenters at one or more geographic locations where the computers communicate using network and/or Internet connections. The communication channel 106 may include any suitable communication mechanism for electronic communication between the client 102 and the platform 104. The communication channel 106 may incorporate local area networks (LANs), wide area networks (WANs), virtual private networks (VPNs), cellular networks (e.g., long term evolution networks), and/or other network types for transferring data between the client 102 and the platform 104. For example, the communication channel 106 may include an Internet connection when the client 102 is not on a local network common with the platform 104. Additionally or alternatively, the communication channel 106 may include network connection sections when the client and the platform 104 are on different networks or entirely using network connections when the client 102 and the platform 104 share a common network. Although only a single client 102 is shown connected to the platform 104, it should be noted that platform 104 may connect to multiple clients (e.g., tens, hundreds, or thousands of clients).

Through the platform 104, the client 102 may connect to various devices with various functionality, such as gateways, routers, load balancers, databases, application servers running application programs on one or more nodes, or other devices that may be accessed via the platform 104. For example, the client 102 may connect to an application server 107 and/or one or more databases 108 via the platform 104. The application server 107 may include any computing system, such as a desktop computer, laptop computer, server computer, and/or any other computing device capable of providing functionality from an application program to the client 102. The application server 107 may include one or more application nodes running applications such as the knowledge management systems described herein, whose functionality is provided to the client locally or via the platform 104. The application nodes may be implemented using processing threads, virtual machine instantiations, or other computing features of the application server 107. Moreover, the application nodes may store, evaluate, or retrieve data from the databases 108 and/or a database server.

The databases 108 may contain a series of tables containing information about assets and enterprise services controlled by a client 102 and the configurations of these assets and services. The assets and services may include computers and/or other devices on a client accessible network 112 (or group of networks) separate from or contiguous with the cloud based resources. As such, the assets and services may include a combination of physical resources or virtual resources. The virtual resources and/or the other connected devices may operate knowledge applications having facet-based search systems, such as the ones described herein. These applications may also manage and retrieve data from storage devices, such as the databases 108.

Although the system 100 is described as having the application servers 107, the databases 108, the communications channel 128, the gateway server 126, and the like, it should be noted that the embodiments disclosed herein are not limited to the components described as being part of the system 100. Indeed, the components depicted in FIG. 1 are merely provided as example components and the system 100 should not be limited to the components described herein. Instead, it should be noted that other types of server systems may implement the knowledge applications, the knowledge databases, and the search systems described herein. Further, it should be noted that server systems described herein may communicate with each other via a number of suitable communication protocols, such as via wired communication networks, wireless communication networks, and the like. In the same manner, the client 102 may communicate with a number of server systems via a suitable communication network without interfacing its communication via the platform 104.

Figure 2:
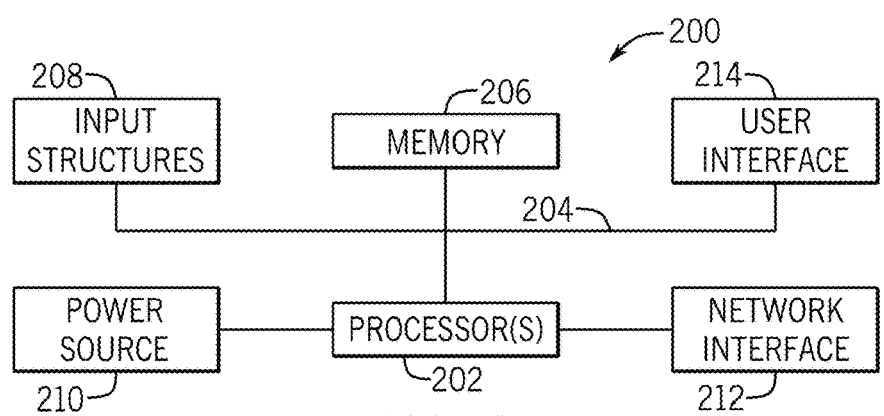
FIG. 2 is a block diagram of a computing device utilized in the distributed computing system of FIG. 1, in accordance with an embodiment.

In any case, to perform one or more of the operations described herein, the client 102, the application server 107, the gateway server 126, and other server or computing system described herein may include one or more of the computer components depicted in FIG. 2. FIG. 2 generally illustrates a block diagram of example components of a computing device 200 and their potential interconnections or communication paths, such as along one or more busses. As briefly mentioned above, the computing device 200 may be an embodiment of the client 102, the application server 107, a database 108, other servers or processor-based hardware devices present in the platform 104, a device running the gateway server 126, and/or any of the CIs 110. As previously noted, these devices may include a computing system that includes multiple computing devices and/or a single computing device, such as a mobile phone, a tablet computer, a laptop computer, a notebook computer, a desktop computer, a server computer, and/or other suitable computing devices.

As illustrated, the computing device 200 may include various hardware components. For example, the device includes one or more processors 202, one or more busses 204, memory 206, input structures 208, a power source 210, a network interface 212, a user interface 214, and/or other computer components useful in performing the functions described herein. The one or more processors 202 may include a processor or other circuitry capable of performing instructions stored in the memory 206 or in other accessible resources. For example, the one or more processors may include microprocessors, system on a chip (SoCs), or any other performing functions by executing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206. Moreover, the functions of the one or more processors 202 may be distributed across multiple processors in a single physical device or in multiple processors in more than one physical device. The one or more processors 202 may also include specialized processors, such as a graphics processing unit (GPU).

The one or more busses 204 include suitable electrical channels to provide data and/or power between the various components of the computing device. For example, the one or more busses 204 may include a power bus from the power source 210 to the various components of the computing device. Additionally, in some embodiments, the one or more busses 204 may include a dedicated bus among the one or more processors 202 and/or the memory 206. The memory 206 may include any tangible, non-transitory, and computer-readable storage media. For example, the memory 206 may include volatile memory, non-volatile memory, or any combination thereof. For instance, the memory 206 may include read-only memory (ROM), randomly accessible memory (RAM), disk drives, solid-state drives, external flash memory, or any combination thereof. Although shown as a single block in FIG. 2, the memory 206 can be implemented using multiple physical units in one or more physical locations. The one or more processors 202 access data in the memory 206 via the one or more busses 204.

The input structures 208 provide structures to input data and/or commands to the one or more processors 202. For example, the input structures 208 include a positional input device, such as a mouse, touchpad, touchscreen, and/or the like. The input structures 208 may also include a manual input, such as a keyboard and the like. These input structures 208 may be used to input data and/or commands to the one or more processors 202 via the one or more busses 204. The input structures 208 may alternative or additionally include other input devices. For example, the input structures 208 may include sensors or detectors that monitor the computing device 200 or an environment around the computing device 200. For example, a computing device 200 can contain a geospatial device, such as a global positioning system (GPS) location unit. The input structures 208 may also monitor operating conditions (e.g., temperatures) of various components of the computing device 200, such as the one or more processors 202.

The power source 210 can be any suitable source for power of the various components of the computing device 200. For example, the power source 210 may include line power and/or a battery source to provide power to the various components of the computing device 200 via the one or more busses 204. The network interface 212 is also coupled to the processor 202 via the one or more busses 204. The network interface 212 includes one or more transceivers capable of communicating with other devices over one or more networks (e.g., the communication channel 106). The network interface may provide a wired network interface, such as Ethernet, or a wireless network interface, such an 802.11, Bluetooth, cellular (e.g., LTE), or other wireless connections. Moreover, the computing device 200 may communicate with other devices via the network interface 212 using one or more network protocols, such as Transmission Control Protocol/Internet Protocol (TCP/IP), power line communication (PLC), Wi-Fi, infrared, and/or other suitable protocols. A user interface 214 may include a display that is configured to display images transferred to it from the one or more processors 202. The display may include a liquid crystal display (LCD), a cathode-ray tube (CRT), a light emitting diode (LED) display, an organic light emitting diode display (OLED), or other suitable display. In addition and/or alternative to the display, the user interface 214 may include other devices for interfacing with a user. For example, the user interface 214 may include lights (e.g., LEDs), speakers, and the like.

Figure 3:
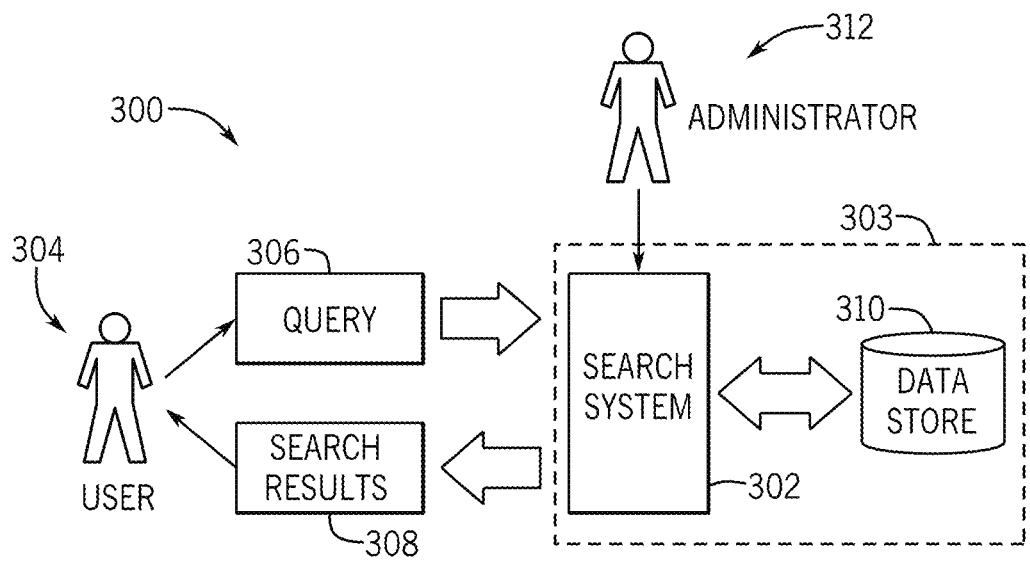
FIG. 3 is a block diagram of use cases for a search system that may be present in knowledge platforms and/or applications provided by computing system of FIG. 1, in accordance with an embodiment.

With the foregoing in mind, FIG. 3 provides a schematic diagram 300 of a search system 302 that may be used in a knowledge application 303. In the search system 302, a user 304 may enter a query 306 to search system 302, and the search system may return search results 308 to a user based on the query 306. Search system 302 may identify documents in data store 310 that may be associated with query 306. Note that a document in data store 310 may have particular attributes that may assist indexing. Examples of attributes include article author, article text, draft date, content, rating, title, title, associated product, or any other identifier. If data store 310 employs a relational database, the documents may be stored in tables, and the attributes may correspond to columns of the table. In non-relational databases (e.g., non-SQL databases, noSQL databases), attributes may correspond to metadata (e.g., tags) stored in the documents. Search system 302 may identify attributes in the query 306 and improve the quality of search results 308. For example, the user 304 may specify that he is seeking articles authored by a particular author and search system 302 may search for documents in data store 310 based on an "author name" attribute.

Search results 308 may also include attribute data to user 304 to improve the user experience and search refining. Search results 308 may include or otherwise be presented with facets, which, as used herein, are data elements assembled from a list of attributes and attribute entries, along with documents identified by the search system 302. The user may refine the search based on interaction with these facets. For example, a knowledge application 303 related to customer support for a consumer goods corporation may have documents that have product names as an attribute. A user 304 seeking help with the product may enter a query 306 with an error code in search system 302. The search system 302 may, in response, provide a search result 308 including list of documents related to that error code as well as a facet based on the product name attributes, generated from the product names in that list of documents. User 304 may quickly refine the search by choosing the appropriate product from the list of products that may be selected from via the facet.

The knowledge application 303 may be managed and/or configured by an administrator 312. Administrator 312 may configure various aspects of the knowledge application 303, including the search system 302. For example, the administrator may configure the specific data store 310 used by the search system 302, and which of the tables of the data store 310 should be searched. The administrator 312 may also configure a UI of the search system 302 that is displayed to the user 304 during the interaction. For example, administrator 312 may configure the format and UI of query 306. The administrator may also configure the manner in which the search results 308 are displayed, by adjusting, among other things, how much information is provided in the document list, which facets may be displayed and UI and interaction rules for the facets. As detailed below, administrator 312 may configure the UI of the various elements of an interface in a seamless and dynamic manner by employing modular templates. Templates may include search results templates, facet templates, query templates, and any other UI elements of the search system 302.

Figure 4:
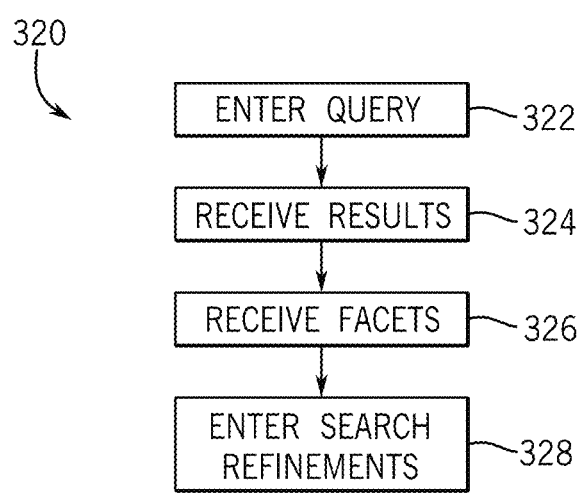
FIG. 4 is flow chart of a method for searching specific documents and refining the search results in a knowledge platform and/or application provided by the computing system of FIG. 1, in accordance with an embodiment.

The flow chart 320 in FIG. 4 illustrates an example of a use case for search system 302. This use case is described along with the UI 350 illustrated in FIG. 5. In a step 322, user 304 may enter a query 306 into the search system 302. The query 306 may be entered in a search box 352. When user 304 is entering the query initially, UI 350 may display only a search box 352. The search box 352 may also be provided in a different part of the knowledge application, with other interfaces. In step 324, user 304 receives a list of results 354 that result from the search systems processing of the query. The list of results 354 may consist of various search entries 355 that preview the content of the documents stored in data store 310 that are associated with the query 306. User 304 may also manipulate the results of the search by adjusting sorting 356 or selecting a result page 357, to scan the search results 354.

User 304 may also receive in a step 326 a facet panel 360 including a multiple of facets 362 (e.g., facet UI elements). Each facet 362 provides a list of facet values that may be associated with a particular attribute of the documents stored in data store 310. In some implementations, a facet value may be produced by merging multiple attribute values of the documents in data store 310. For example, an author's first name and last name may be recorded as two separate attributes in data store 310, and a full name facet value may be produced by combining both attributes. Search system may produce facets dynamically based on the documents and/or the search results 354. For example, data for a facet 362 may be produced based on the attributes of the documents in search results 354, or based on the attributes of all the documents in data store 310. As another example, a facet 362 may provide as a facet value a link to an article in a data store 310 (e.g., a knowledge base article). In some implementations, data for the facet may also be pre-stored in the data store 310. Administrator 312 may configure the method to populate data for facets 362 via a UI, without need for rewriting the code of the search system 302.

In some situations, the facet 362 may include facet values that indicate the databases that a user wants to use as data source. As discussed above, data store 310 may be distributed across many databases (e.g., enterprise databases). In such situations, search system 302 may provide a facet 362 having as facet values the multiple available databases for search. Furthermore, in some situations search system may be shared across multiple applications of a platform. For example, "community pages" platforms may have content distributed across multiple applications, such as question and answers, blogs, videos, polls, events, etc. A search system 302 in this platform may be shared by multiple applications. In such situation, the search system 302 may provide a facet 362 that allows refinement of search based on the application associated with the content. In this example, the facet values of such application facet may be an application of the platform.

User 304 may interact with facet 362 via the UI elements provided in facet panel 360 to refine the search results in a step 328. Refinements of the search results 354 may narrow the list of returned search documents based on the attributes associated with facets 362. In the illustrated example of UI 350, the user 304 may narrow the search by selecting an entry in any of the facets 362: the knowledge base, the category, the author, the rating, the modification date or the view count of the documents. Note that each of the facets 362 may employ different UI elements. Administrator 312 may configure the UI elements of each facet by selecting a facet template from among a set of interchangeable facets and associating it with the facet. Administrator 312 may also adjust the order in which elements are displayed as well as the visual style (e.g., style, stylesheet, color palette, fonts) of the facets 362 UI without substantial recoding. It should be noted that in some implementations, multiple users may use this system. Accordingly, users may share the results of the search and/or of the refinements with some other user via the search system 302. This sharing may be facilitated sending the search results to a remote client instance of the application being used by the other user.

Figure 6:
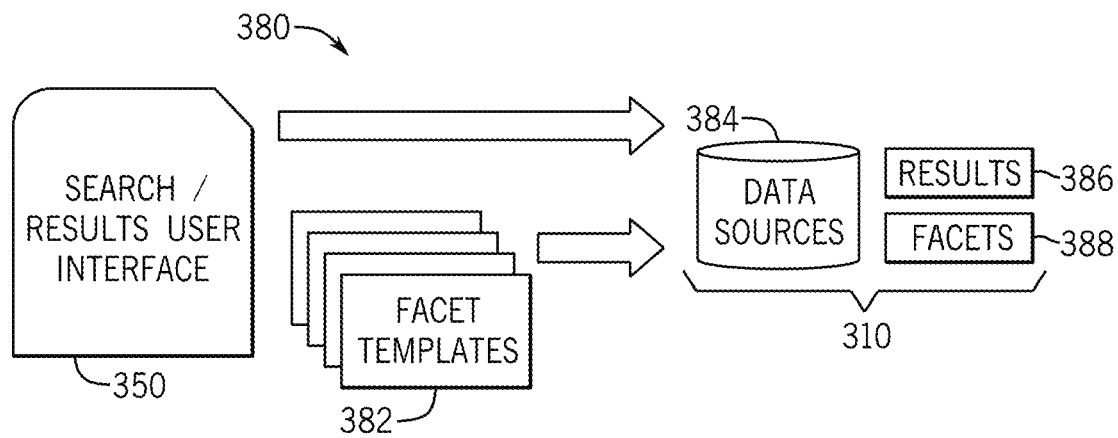
FIG. 6 is a block diagram for the operation of a templated-based faceted search system such as the one illustrated in FIG. 3, in accordance with an embodiment.

The diagram 380 in FIG. 6 provides a schematic diagram of the architecture of template-based faceted search system 302. Search results UI 350 includes a facet panel 360 that may include UI elements of any of the facet templates 382. The search results UI 350 and the facet templates 382 may be sourced from data store 310. Data store 310 may include any number of data sources 384 (e.g., enterprise data, source tables, data repositories). In response to a query, search system may scan data sources 384 to identify appropriate search result data elements 386 and facets 388, as described above. Search results 386 may be provided to the front end UI 350 and displayed to a user. Similarly, each of the facets 388 is associated with a corresponding facet template 382 and combined to form a facet panel in the search interface 350. Note that the facet templates 382 are separated (e.g., abstracted) from facets 388. This separation allows modular replacement of the facet template 382 associated with a particular facet 388.

Figure 7:
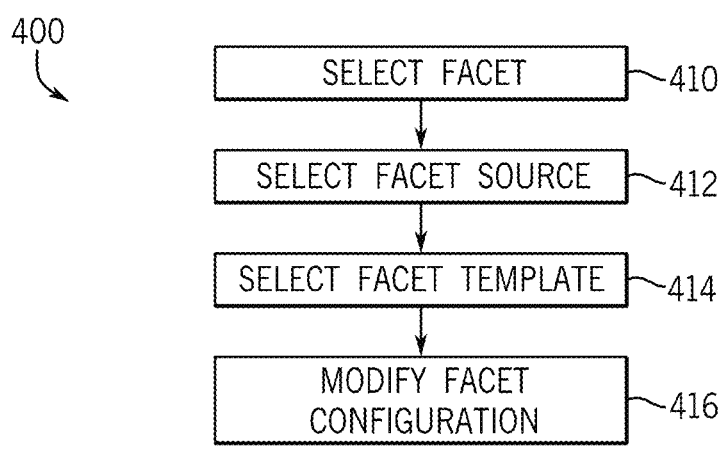
FIG. 7 is a flow chart of a method to modify a template-based faceted search system such as the one illustrated in FIG. 3, in accordance with an embodiment.

Flow chart 390 in FIG. 7 illustrates an example of a use case for configuration of a facet template search system 302. An administrator may change and/or configure a facet based on the type of content searched by the facet. For example, a facet template that uses checkboxes for facet values allows the end user to refine the search results by selecting more than one facet value at a time (checkboxes are usually used in multi-select use case scenarios). In contrast, a facet template that includes a link or a radio button allows only one facet value to be chosen at a time. As exemplified by flow chart 390, the administrators can declaratively choose what they want for a specific deployment of the search UI 350 (e.g., a Knowledge Search UI). The option to choose one among many facet templates is provides power and flexibility to the administrator as it allows them to deploy quickly a UI that allows for a high performance and responsiveness in search experience.

Figure 8:
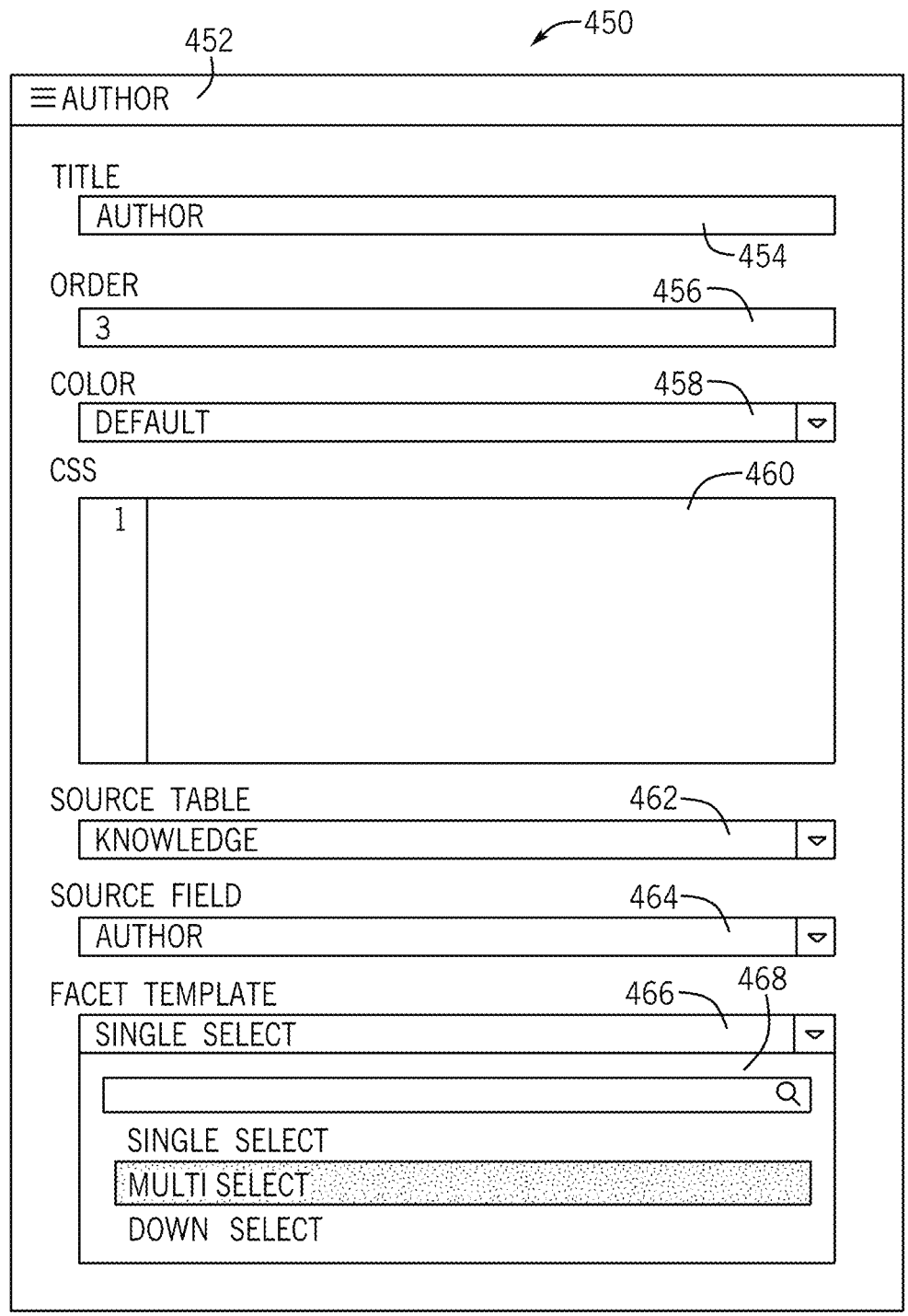
FIG. 8 is a diagram of a configuration UI that may be used to modify the templated-based faceted search UI of FIG. 5, in accordance with an embodiment.

Flow chart 390 is described along with a configuration UI 450 illustrated in FIG. 8. In a step 392 an administrator selects a facet 452 to be configured. The selection of the facet may include the creation of a new facet being added, or may include editing an existing facet or facets. In response to facet selection, UI 450 may be displayed to the administrator. In the example, facet 452 is associated with the author of the documents. The administrator may also rename facet 452 by editing the title 454. In a step 394, the administrator selects the field and the data source and the attributes that are associated with facet 452. In a search system that operates with a relational database, a source table may be selected via a data source UI element 462. While the data source in this example refers to a table, other data sources, such as directory in a file system or a universal reference identifier (URI) may be used. Other UI elements may be employed for this entry. The administrator may then choose a field (e.g., attribute) that is associated with the facet via a field selection UI element 464. In some implementations, the facet 452 may include multiple attributes.

In a step 396, the administrator selects a look-and-feel of the UI elements of the facet, including a facet template. In UI 450, the example includes selection of the order of the facet within the facet panel (order UI element 456), selection of a color (color UI element 458), and so forth. The administrator may further edit the style (e.g., stylesheet) for the facet by editing a textbox 460. The style may be encoded in a particular language or protocol, such as a cascading stylesheet (CSS). The administrator may further configure the UI elements of facet 452 by choosing a facet template via facet template UI element 466. The administrator may choose a template from a list of templates 468. The choice of one of the templates may quickly provide a desired look-and-feel for the facet UI with no coding. The administrator may confirm the changes by confirming the configuration in a step 398. Note that while the above example is described by way of employing configuration UI 450, the use case described in flow chart 390 may be performed by making changes in a configuration file. This configuration file may be structured in a pre-determined format provided by the search system 302 or the knowledge application 303, and may be performed by modification via plain text editors or other suitable editing tools.

Figure 5:
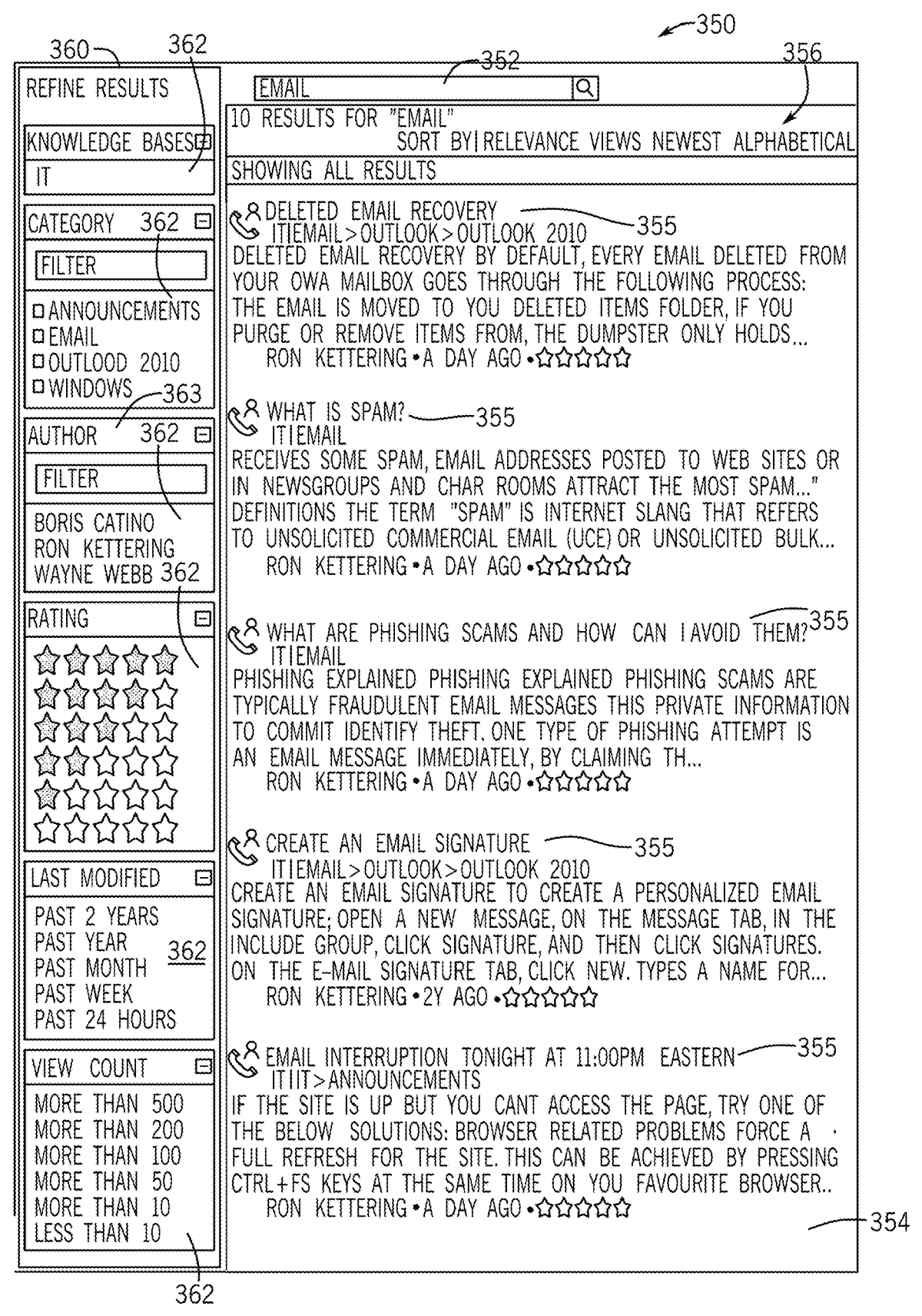
Figure 9:
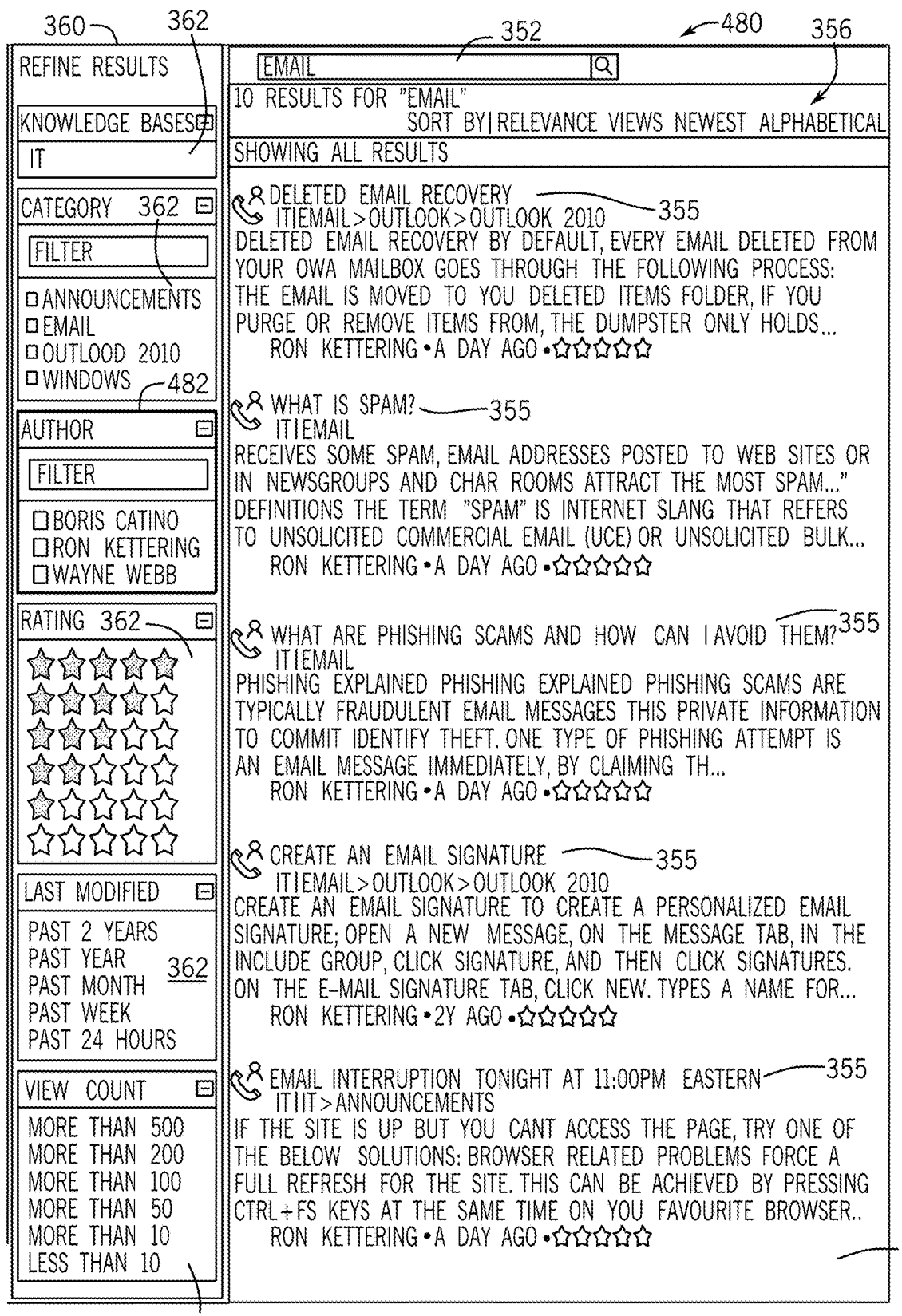
FIG. 9 is a diagram of the template-based, faceted search UI of FIG. 5 following a modification of a template-based facet, in accordance with an embodiment.

The UI 480 in FIG. 9 illustrates a result of the administrator use case illustrated by flow chart 390 applied to UI 350 in FIG. 5. UI 480 includes search box 352, a list of results 354, facet panel 360, and facets 363. UI 480 in FIG. 9 is a result of a modification of the author facet (element 482) by means of changing the facet template of the author facet (element 363) of FIG. 5. In FIG. 5, author facet (element 363) employs a link facet template, in which the user may interact directly with the facet attributes as listed, as detailed below. The administrator may change the look-and-feel of the author facet via, for example, a configuration UI 450, and choose a checkbox facet template, in which the user may choose any number of the facet attribute listed. Changes of look-and-feel of the facets via facet templates allow fast and dynamic modification of the user experience.

Figure 10A:
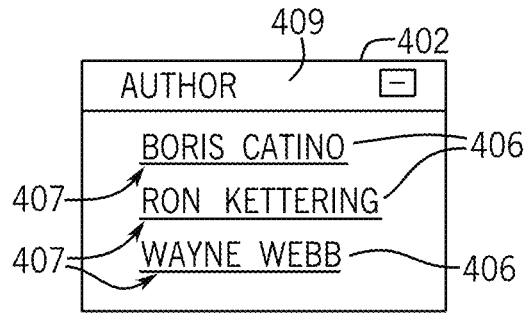
FIGS. 10A-G are examples of facet templates that may be used in a template-based faceted search system, in accordance with an embodiment.

As described above, the user experience may be adjusted by choosing one facet template from a list of facet templates. FIGS. 10A-G provide some examples of facet templates that may be used in template-based faceted search system, such as the ones described above. It should be noted that FIGS. 10A-G are not an exhaustive list of possible facet templates, and are provided to illustrate certain of the features of facets and the relation between facet and facet templates. FIG. 10A depicts a link facet template 402. Link facet template 402 may display a header 404 that may be the title of facet. Template 402 may also have a list of facet values 406. Each attribute of list of facet values 406 may be a clickable or otherwise selectable UI element 407. Upon clicking on an element, the search system may refine the search results and return documents in the search result having an attribute that matches the attribute selected through facet template 402.

Figure 10B:
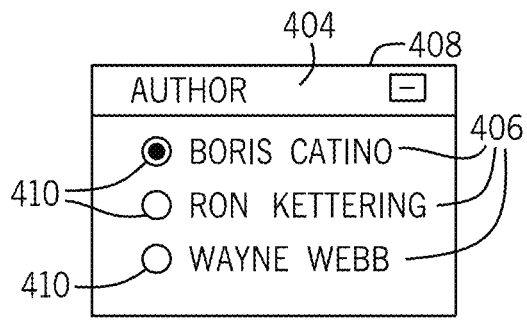
Figure 10C:
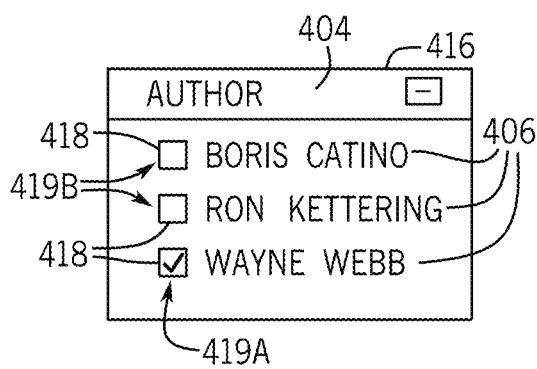
Figure 10D:
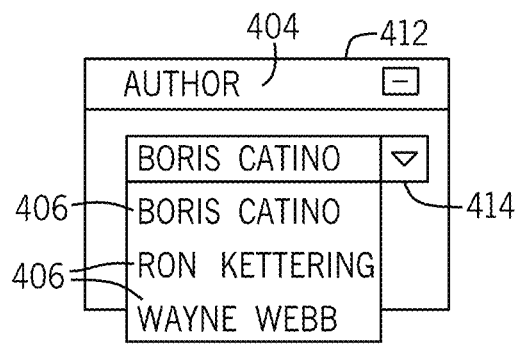
Figure 10E:
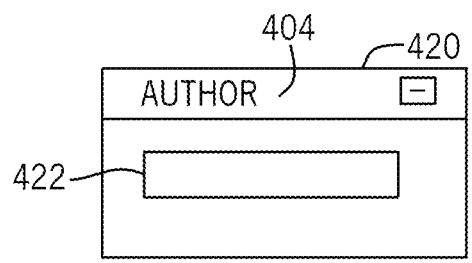
Figure 10F:
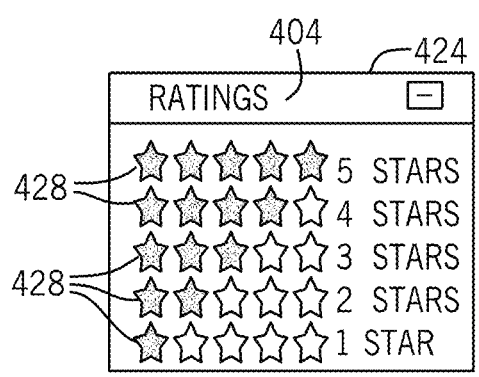
Figure 10G:
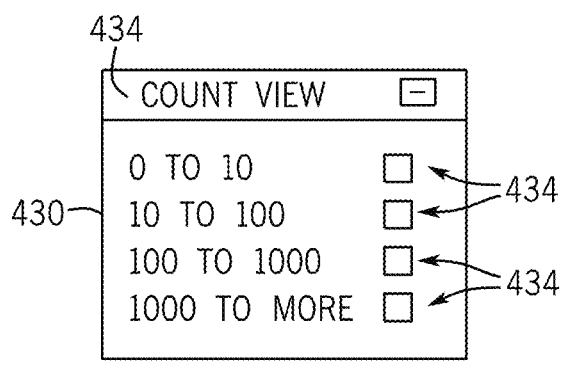

A second example of a facet template is the radio box facet template 408 in FIG. 10B. Radio button facet template 408 may have a header 404 and a list of facet values 406, as with the link facet template 402. However, in the radio box facet template 408, the user will interact with one of the radio buttons 410 to choose a specific entry from the list of facet values 406. Facet templates 402 and 408 may display all entries of the list of facet values 406 at once. In some situations, the administrator may desire a more compact facet UI. Drop-down facet template 412, illustrated in FIG. 10C, employs a drop-down menu 414 that, when interacted with, may be used by the user to choose an element from the list of facet values 406.

Link facet template 402, radio button facet template 408, and drop-down facet template 412 may each be a single-select UI, i.e., it allows the user to select a single entry from the list of available facet values 406. In some knowledge applications, certain facets may be provided that allow a user to select multiple entries (e.g., multi-select UI) from the list of facet values 406. By way of example, checkbox facet template 416, illustrated in FIG. 10D, allow a user to select multiple entries from a list of facet values 406 by selecting any number of checkboxes 418. A selected checkbox 419A may be visually different from an unselected checkbox 419B to facilitate the user's visualization of the search refinement.

In some situations, facets that allow free text entry for filtering may be appropriate. Textbox facet template 420 of FIG. 10E may be used to allow the user to refine a search employing character strings, such as free text in a textbox 422.

Documents in a data store 310 may also include numerical attributes. Examples of such instances include a price, a rating, a view count, a download count, among many others. In such instances, facet templates that employ a list of facet values including icons, discrete numbers, or ranges may be used. Rating facet template 424 illustrated in FIG. 10F, for example, allows the user to refine a search based using a rating facet 426. In rating facet template 424, the user is provided with multiple rating choices 428 for selection. Note that instead of presenting the attribute, rating facet template 424 present graphical representation of the values as facet values. Another example of a facet template for numerical attributes is a range facet template 430, illustrated in FIG. 10G. The range facet template 430 may be associated with an attribute that may be refined by the use of ranges as facet values, instead of a list of the attributes (i.e., the actual numbers stored in the documents). In the example, count view 434 is illustrated. Search system may produce multiple ranges 434 (e.g., count view ranges) based on the list of attributes and provide them to the user for selection. Ranges may be generated dynamically based on the search results, or it may be a pre-programmed hard coded range, as configured by the administrator. In some implementations, facets may also provide dates aggregated in discrete periods. For example, in the "Last Modified" facet exemplified in facet panel 360 of FIG. 5, the facet may have values such as "Past 2 Years," "Past Year," "Past Month," "Past Week," and/or "Past 24 Hours." The aggregated date entries may be statically and/or dynamically determined.

Embodiments describe herein provides a customizable, faceted search experience that is template-based. The embodiments may allow administrators to build sophisticated facet interactions that are independent of the particular facet and may allow users and administrators of knowledge applications to mix and match facets and facet interactions in a declarative manner, with no coding. As a result, search systems may have flexible customization, reduced implementation time, which may improve the return on investment (ROI).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

Further, if any claims appended to the end of this specification contain one or more elements designated as "means for [perform]ing [a function] . . . " or "step for [perform]ing [a function] . . . " it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A non-transitory, computer readable medium comprising instructions that, when executed by a processor, causes the processor to perform operations comprising:
   receiving a search query;
   retrieving search results from a database based on the search query;

identifying a plurality of facets based on the search results, wherein each facet comprises:
a set of attributes of the search results; and
a configurable facet template selected from a set of facet templates, the facet templates comprising respective visual renderings of a facet, wherein facet templates for a respective facet are interchangeable;
providing a facet configuration user interface configured to alter the visual rendering of the respective facet, the facet configuration user interface comprising one or more selectable objects, at least one of the one or more selectable objects comprising the set of facet templates;
receiving a selection of the configurable facet template from the set of facet templates; and
displaying the search results in conjunction with the plurality of facets wherein an appearance of the search results is based at least in part on the selected facet template, wherein the plurality of facets are configured to refine the search results based on the set of attributes of the respective facet.

2. The non-transitory, computer readable medium of claim 1, wherein the operations comprise determining one or more databases in response to the search query, the retrieval of search results comprise retrieving search results from the one or more databases, and the identification of the plurality of facets comprise identifying the plurality of facets from the one or more databases.

3. The non-transitory, computer readable medium of claim 2, wherein the facet templates correspond to a shared knowledge database from the one or more databases.

4. The non-transitory, computer readable medium of claim 2, wherein the plurality of facets comprise at least one facet comprising a facet value that comprises a database from the one or more databases.

5. The non-transitory, computer readable medium of claim 1, wherein:
the set of attributes comprises a plurality of facet values;
the set of attributes enable refining the search results when applied; and
the facet values of at least one facet of the plurality of facets comprise a link to a knowledge base article.

6. The non-transitory, computer readable medium of claim 1, wherein:
the set of attributes comprises a plurality of facet values;
the set of attributes enable refining the search results when applied; and
the facet values of at least one facet of the plurality of facets comprise a content source associated with the search results.

7. The non-transitory, computer readable medium of claim 1, wherein the operations comprise sharing the search results with a remote client.

8. The non-transitory, computer readable medium of claim 1, wherein an administrator changes the facet of the plurality of facets using the facet configuration user interface.

9. The non-transitory, computer readable medium of claim 1, wherein the set of facet templates comprise single select facet templates and multi select facet templates.

10. A method, comprising:
providing a plurality of applications, wherein the plurality of applications comprise a plurality of documents stored in a data source;
providing a search system that searches the plurality of documents of the plurality of applications, wherein the search system is configured to:
receive a search query;
retrieve search results from the plurality of documents based on the search query;
identify at least one facet from the data source, wherein the at least one facet comprises:
a set of attributes of the search results; and
a configurable facet template selected from a set of facet templates, the facet templates comprising respective visual renderings of the at least one facet, wherein facet templates for the at least one respective facet are interchangeable;
provide a facet configuration user interface configured to enable alteration of the visual rendering of the at least one facet, the facet configuration user interface comprising one or more selectable objects, at least one of the one or more selectable objects comprising the set of facet templates;
receive a selection of the configurable facet template from the set of facet templates; and
display the search results in conjunction with the at least one facet wherein an appearance of the search results is based at least in part on the selected facet template, wherein the at least one facet is configured to refine the search results based on the set of attributes of the at least one facet.

11. The method of claim 10, wherein:
each attribute comprises a plurality of facet values; and
the data source comprises a plurality of databases, and wherein the at least one facet comprises an attribute associated with a database of the plurality of databases.

12. The method of claim 10, wherein:
each attribute comprises a plurality of facet values; and
the at least one facet comprises an attribute associated with the applications.

13. The method of claim 10, wherein the facet values are generated dynamically based on the search results.

14. The method of claim 10, wherein the identification of the at least one facet is based on the search results.

15. The method of claim 10, wherein the set of facet templates comprises a link facet template, a radio button facet template, a check box facet template, a drop-down facet template, a text facet template, or a rating facet template.

16. A non-transitory, computer readable medium storing instructions that, when executed by a processor, causes the processor to perform operations comprising:
receiving a facet of a search system that identifies documents in an application based on a query, wherein the facet provides a search refinement;
providing a facet configuration user interface configured to alter a visual rendering of the facet, the configuration user interface comprising one or more selectable objects, at least one of the one or more selectable objects comprising a set of facet templates;
receiving a selection of a configurable facet template for the facet; and
presenting search results wherein an appearance of the search results is based at least in part on the selected configurable facet template and the query.

17. The non-transitory, computer readable medium of claim 16, wherein the operations comprise receiving a data source comprising a set of databases of the application for the facet.

18. The non-transitory, computer readable medium of claim 16, wherein the set of facet templates comprise a single-select user interface element or a multi-select user interface element.

19. The non-transitory, computer readable medium of claim 16, wherein the operations comprise receiving at least one attribute for the facet, wherein the at least one attribute for the facet comprises a numerical attribute, and wherein the selected configurable facet template comprises a rating facet template or a range facet template.

20. The non-transitory, computer readable medium of claim 16, wherein receiving the selection is performed via the facet configuration user interface.

* * * * *